United States Patent
Texter

(10) Patent No.: US 8,901,421 B2
(45) Date of Patent: Dec. 2, 2014

(54) DECORATIVE CIRCUIT BREAKER PANEL COVER

(75) Inventor: Michael M. Texter, Titusville, PA (US)

(73) Assignee: Wall Art Covers, LLC, Titusville, PA (US)

( * ) Notice: Subject to any disclaimer, the term of this patent is extended or adjusted under 35 U.S.C. 154(b) by 321 days.

(21) Appl. No.: 13/439,808

(22) Filed: Apr. 4, 2012

(65) Prior Publication Data
US 2013/0265694 A1 Oct. 10, 2013

(51) Int. Cl.
*H05K 5/03* (2006.01)
*H02G 3/14* (2006.01)
*H02B 1/26* (2006.01)
*H02B 1/38* (2006.01)

(52) U.S. Cl.
CPC ... *H02G 3/14* (2013.01); *H02B 1/38* (2013.01)
USPC ............... 174/66; 220/241; 220/3.8; 361/657

(58) Field of Classification Search
CPC .......... H02B 1/30; H02B 1/301; H02B 1/306; H02B 1/38; H02B 1/40; H02B 1/44; H02B 1/46; H02B 2001/0155; H02G 3/14; H02G 3/088; H02G 3/126; H02G 3/081; H02G 3/18; H05K 5/03; G11B 33/027; H01H 23/04; F41G 1/35; F41G 11/002; F41G 11/003; B62J 11/00; A61G 13/101
USPC ............... 361/600–678; 174/66, 67; 220/241, 220/242, 3.8; 335/132
See application file for complete search history.

(56) References Cited

U.S. PATENT DOCUMENTS

| | | | |
|---|---|---|---|
| 4,976,055 A * | 12/1990 | Kane ............................... 40/745 |
| 5,829,622 A * | 11/1998 | Neuman ....................... 220/230 |
| 5,929,379 A * | 7/1999 | Reiner et al. ..................... 174/66 |
| 6,150,609 A * | 11/2000 | Baldwin ......................... 174/66 |
| 6,615,522 B1 * | 9/2003 | Weis ............................... 40/594 |
| 7,049,516 B1 * | 5/2006 | Haag et al. ...................... 174/66 |

* cited by examiner

*Primary Examiner* — Zachary M Pape
(74) *Attorney, Agent, or Firm* — The Webb Law Firm

(57) ABSTRACT

A decorative circuit breaker panel cover can decorate and/or add functionality to a circuit breaker panel cover. In some embodiments, the decorative cover may be, for example, a decorative tin having an inlaid design. In other embodiments, the decorative cover may include a shelving system that fits over the circuit breaker panel.

6 Claims, 3 Drawing Sheets

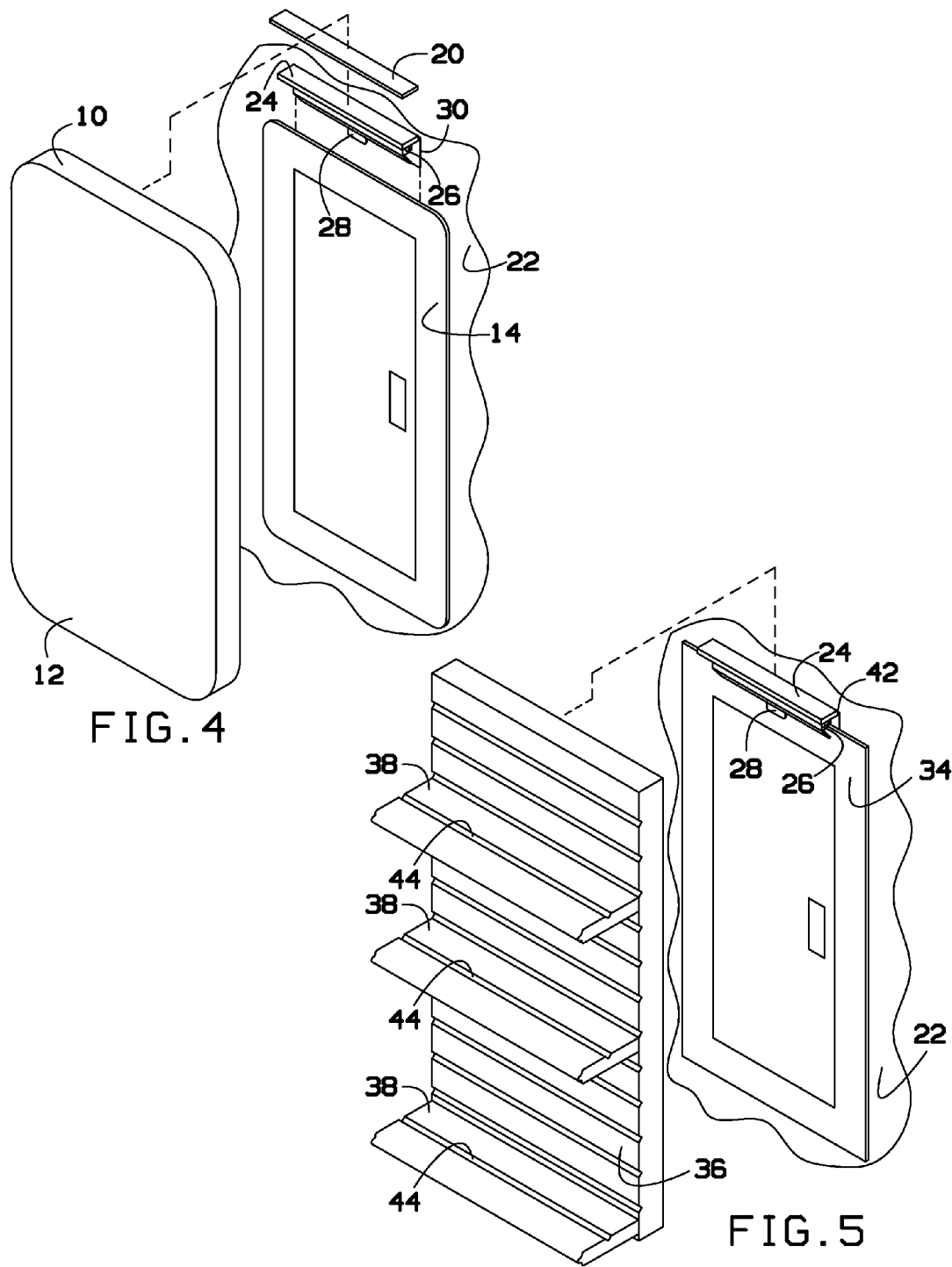

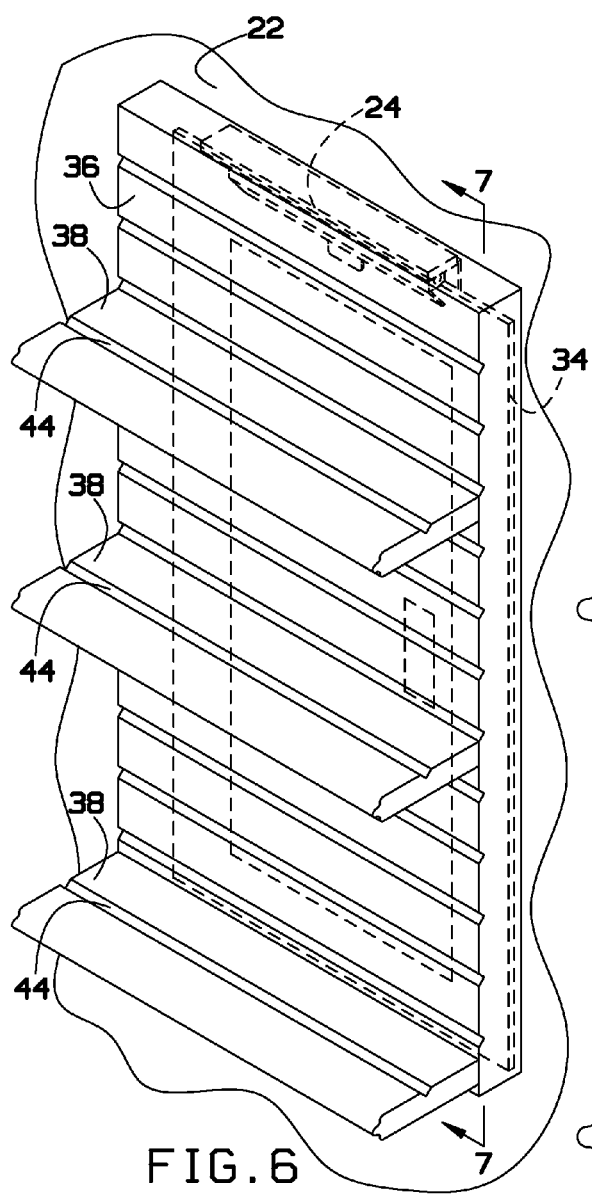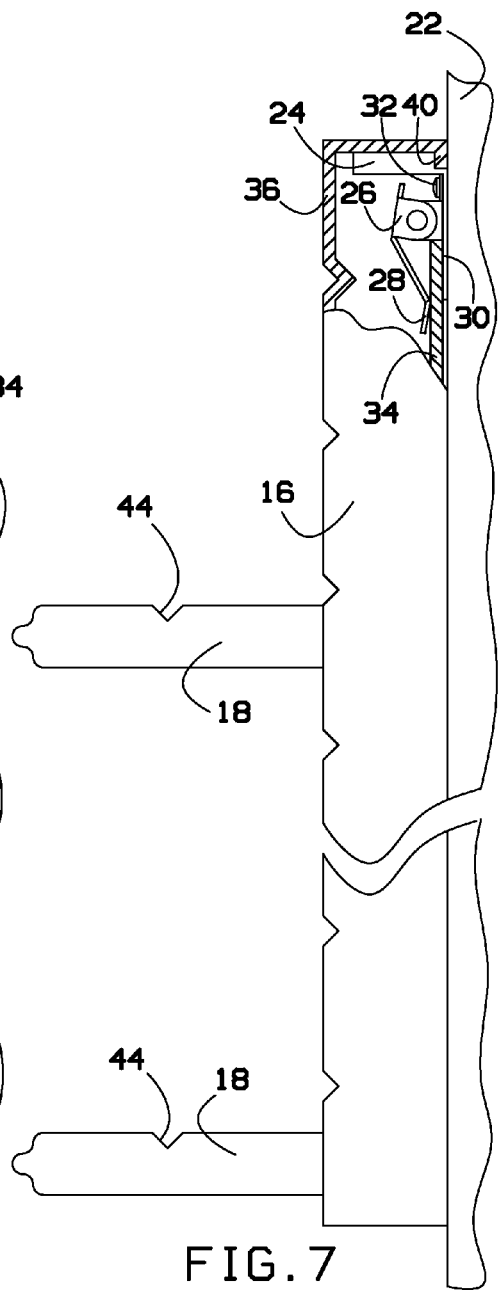

DECORATIVE CIRCUIT BREAKER PANEL COVER

BACKGROUND OF THE INVENTION

The present invention relates to circuit breaker panel covers and, more particularly, to a decorative circuit breaker panel cover that may include a decorative metal cover or a shelving unit.

Circuit breaker panels are often used in commercial and residential electrical installations. These panels often have a hinged metal cover, held in place with a plurality of screws, and a latch release to open the cover to reveal the circuit breakers. These panels may be disposed not only in basements or garages, but may be disposed in living spaces. Electrical codes often require significant space in front of the circuit breaker panel, and, therefore, placement of these panels in more inconspicuous places, such as closets, may be forbidden.

These panels can be unsightly and may not be easily hidden.

As can be seen, there is a need for a decorative circuit panel breaker cover that may easily and conveniently change a plain circuit breaker into a more decorative or functional space.

SUMMARY OF THE INVENTION

In one aspect of the present invention, a circuit breaker panel cover comprises a bracket adapted to be disposed along a top side of a circuit breaker panel; and a cover adapted to be retained by the bracket, the cover fitting over the circuit breaker panel.

In another aspect of the present invention, a circuit breaker panel cover comprises a bracket adapted to be disposed along a top side of a circuit breaker panel; a magnet attached to the bracket; and a decorative metal cover adapted to be retained by the magnet, the cover fitting over the circuit breaker panel.

In a further aspect of the present invention, a circuit breaker panel cover comprises a clamp on bracket including a bracket base fitting behind a circuit breaker panel and a spring loaded clamp adapted to resiliently clamp against the circuit breaker panel when the bracket base is fit behind the circuit breaker panel; a shelf base unit having a retention rail fitting into a retention groove formed in the clamp on bracket, the shelf base unit adapted to cover the circuit breaker panel; and one or more shelves retained by the shelf base.

These and other features, aspects and advantages of the present invention will become better understood with reference to the following drawings, description and claims.

BRIEF DESCRIPTION OF THE DRAWINGS

FIG. 4 is an exploded view of a decorative circuit breaker panel cover having an alternate mounting system, according to an exemplary embodiment of the present invention;

FIG. 5 is a partially exploded view of a decorative circuit breaker panel cover according to another exemplary embodiment of the present invention;

FIG. 6 is a perspective view of the decorative circuit breaker panel of FIG. 5, installed on a circuit breaker panel; and FIG. 7 is a cross-sectional view taken along line 7-7 of FIG. 6.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a decorative circuit breaker panel cover that can decorate and/or add functionality to a circuit breaker panel cover. In some embodiments, the decorative cover may be, for example, a decorative tin having an inlaid design. In other embodiments, the decorative cover may include a shelving system that fits over the circuit breaker panel.

Figure 1:
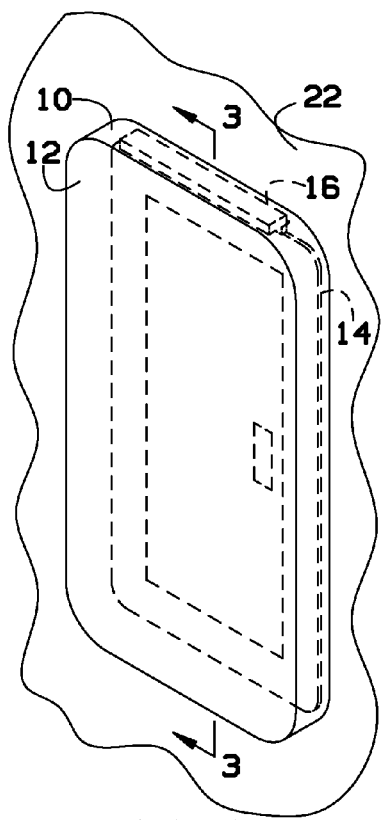
FIG. 1 is a perspective view of a decorative circuit breaker panel cover according to an exemplary embodiment of the present invention.
Figure 2:
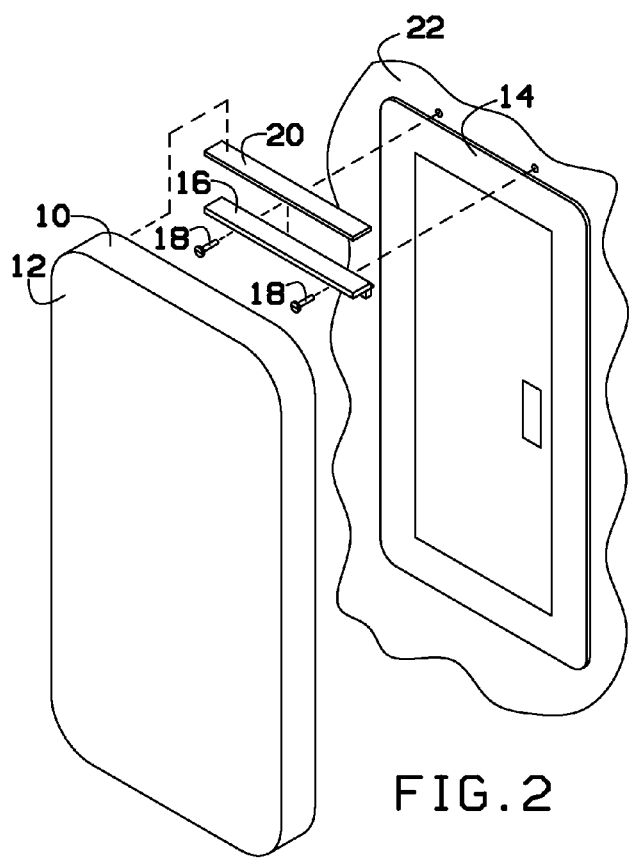
FIG. 2 is an exploded view of the decorative circuit breaker panel cover of FIG. 1.
Figure 3:
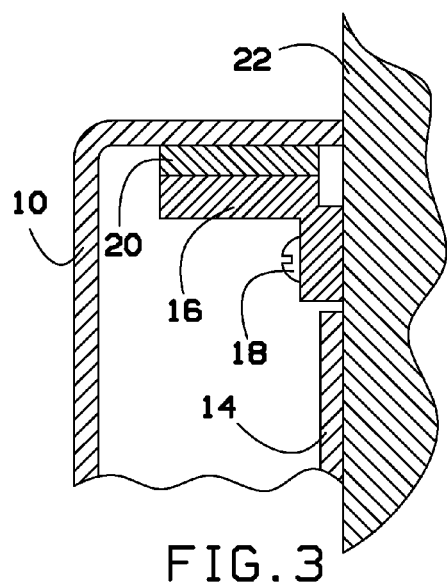
FIG. 3 is a cross-sectional view taken along line 3-3 of FIG. 1.

Referring now to FIGS. 1 through 3, a decorative metal cover 10 may include a decorated surface 12. The decorated surface 12 may include, for example, an inlaid design, a cut design, a printed design, or the like, or some combination thereof. The decorated surface 12 may be designed according to the user's tastes. The decorative metal cover 10 may be easily removed and changed according to the desires of the user. For example, a user may have a different decorative metal cover 10 for the seasons (time of year), holidays, or the like. The decorative metal cover 10 may fit on a circuit break panel cover 14.

In some embodiments, the decorative metal cover 10 may simply attached to the circuit breaker panel cover 14 with one or more magnets (not shown). In this embodiment, the surface 12 may be raised away from the circuit breaker panel cover 14, while the edges of the decorative metal cover 10 may be flush with a wall 22.

In some embodiments, as shown in FIGS. 1-3, the decorative metal cover 10 may attach to the wall 22 with a mounting bracket 16. The mounting bracket 16 may attach to the wall 22, typically just above the circuit breaker panel cover 14, with one or more mounting screws 18, for example. A magnet 20 may attach to the bracket 16. The magnet 20 may retain the decorative metal cover 10 to the bracket 16.

Referring now to FIG. 4, the decorative metal cover 10 may be hung with a clamp on mounting bracket 24 having a spring loaded clamp 26. A thin bracket base 30 may be adapted to slide behind the circuit breaker panel 14. A connector, such as a rivet 32, may be used to connect the mounting bracket 24 to the bracket base 30. A finger tab 28 may be used to resiliently open the mounting bracket 24 and clamp the bracket 24 to the top of the circuit breaker panel 14. Similar to the mounting bracket 16 described above, a magnet 20 may attach to the clamp on mounting bracket 24. The magnet 20 may retain the decorative metal cover 10 to the bracket 24.

Referring to FIGS. 5 through 7, the clamp on mounting bracket 24 may be used to mount a shelf base unit 36 to a circuit breaker panel 34. Shelves 38 may connect to the shelf base unit 36. The shelves 38 may include a notches 44 to help retain items (not shown) on the shelves 38, although these notches 44 may be optional and omitted, providing a flat shelf.

The shelf base unit 36 may include a retention rail 40 formed along a top edge of the shelf base unit 36. The retention rail 40 may fit into a retention groove 42 to secure the shelf base unit 36 to the mounting bracket 24 as shown in, for example, FIG. 7.

The shelf base unit 36 may attach in front of the circuit breaker panel cover 14 through other mechanisms. For example, the mounting bracket 16, modified to include a retention groove (such as retention groove 42) may be used to secure the shelf base unit 36 to the wall 22. In this embodiment, the mounting bracket 16 may be used interchangeable with both the shelf base unit 36 or the decorative metal cover 10.

While the shelf base unit 36 is described as plastic above, other materials are contemplated to be used for the shelf base unit 36, such as metal, composite or the like, within the scope of the present invention.

It should be understood, of course, that the foregoing relates to exemplary embodiments of the invention and that modifications may be made without departing from the spirit and scope of the invention as set forth in the following claims.

What is claimed is:

1. A circuit breaker panel cover comprising:
   a bracket adapted to be disposed adjacent to at least a top side of a circuit breaker panel; and
   a cover adapted to be retained by the bracket, the cover fitting over the circuit breaker panel,
   wherein the bracket includes a spring loaded clamp and a bracket base, the bracket base fitting behind the circuit breaker panel while the spring loaded clamp clamps onto the circuit breaker panel to secure the bracket to the circuit breaker panel.

2. The circuit breaker panel cover of claim 1, further comprising a magnet attached to the bracket, wherein the cover is a decorative metal cover secured by the magnet.

3. The circuit breaker panel cover of claim 1, wherein the cover is a shelf base unit adapted to support one or more shelves therefrom.

4. The circuit breaker panel cover of claim 1, further comprising a retention groove formed along the bracket, the retention groove adapted to hold a retention rail formed in the cover.

5. The circuit breaker panel cover of claim 4, wherein the cover is a shelf base unit adapted to support one or more shelves therefrom.

6. A circuit breaker panel cover comprising:
   a clamp on bracket including a bracket base fitting behind a circuit breaker panel and a spring loaded clamp adapted to resiliently clamp against the circuit breaker panel when the bracket base is fit behind the circuit breaker panel;
   a shelf base unit having a retention rail fitting into a retention groove formed in the clamp on bracket, the shelf base unit adapted to cover the circuit breaker panel; and
   one or more shelves retained by the shelf base.

* * * * *